(12) United States Patent
Chainani et al.

(10) Patent No.: US 10,693,709 B2
(45) Date of Patent: Jun. 23, 2020

(54) PROCESSING GAP EVENTS IN A CHANGE DETECTION MANAGEMENT SYSTEM

(71) Applicant: salesforce.com, inc., San Francisco, CA (US)

(72) Inventors: Mikhail Chainani, San Francisco, CA (US); Vijay Devadhar, Fremont, CA (US); William Dumaresq, San Francisco, CA (US); Venkat Chandrasekaran, Pleasanton, CA (US); Jia Chen, Foster City, CA (US); Utsavi Benani, Fremont, CA (US); Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 106 days.

(21) Appl. No.: 15/937,945

(22) Filed: Mar. 28, 2018

(65) Prior Publication Data
US 2019/0306008 A1    Oct. 3, 2019

(51) Int. Cl.
*G06F 15/173* (2006.01)
*G06F 15/16* (2006.01)
*H04L 12/24* (2006.01)
*G06F 15/177* (2006.01)

(52) U.S. Cl.
CPC .................... *H04L 41/06* (2013.01)

(58) Field of Classification Search
CPC ....................................... H04L 63/08
USPC ................................. 709/231, 224
See application file for complete search history.

(56) References Cited

U.S. PATENT DOCUMENTS

| | | | | |
|---|---|---|---|---|
| 7,568,034 B1* | 7/2009 | Dulitz | ................. | G06F 9/5033 709/226 |
| 7,756,827 B1* | 7/2010 | Yung | ................... | G06F 16/283 707/634 |
| 9,413,708 B1* | 8/2016 | Michael | ................. | H04L 51/24 |
| 10,268,709 B1* | 4/2019 | Suehs | ................... | G06F 16/211 |
| 2006/0080160 A1* | 4/2006 | Orumchian | ....... | G06F 16/90335 705/7.31 |
| 2006/0279628 A1* | 12/2006 | Fleming | ............... | G11B 27/034 348/143 |
| 2008/0034182 A1* | 2/2008 | Takemura | ............. | G06F 12/023 711/173 |
| 2009/0013012 A1* | 1/2009 | Ichikawa | ............ | G06F 11/1464 |
| 2012/0106366 A1* | 5/2012 | Gauvin | ............... | H04L 43/0835 370/252 |
| 2015/0128162 A1* | 5/2015 | Ionescu | ............. | H04N 21/6125 725/14 |
| 2015/0347683 A1* | 12/2015 | Ansari | ................... | H04L 63/08 726/7 |

(Continued)

*Primary Examiner* — Karen C Tang
(74) *Attorney, Agent, or Firm* — Holland & Hart LLP

(57) ABSTRACT

A system may identify gap events in a change detection stream. When changes in data are transmitted to a downstream system, the system may identify intermittent portions of the transmission where data is missing (e.g., a gap event). In some examples, a gap event may be caused by system maintenance or one or more system errors. After identifying the gap event, the system may bridge the gap event using metadata associated with the gap event. The associated metadata may be transmitted (e.g., via a gap event identification message) to the downstream system, which may prevent the downstream system from experiencing computational inefficiencies due to the gap event.

20 Claims, 11 Drawing Sheets

(56) References Cited

U.S. PATENT DOCUMENTS

| | | | |
|---|---|---|---|
| 2016/0110249 A1* | 4/2016 | Orme | G06F 12/0238 |
| | | | 714/6.24 |
| 2017/0212751 A1* | 7/2017 | Mak | G06F 8/71 |
| 2017/0242630 A1* | 8/2017 | Kephart | G06F 3/0661 |
| 2017/0243131 A1* | 8/2017 | Kephart | G06Q 10/0637 |
| 2017/0277715 A1* | 9/2017 | Strauss | G06F 16/1865 |
| 2018/0035153 A1* | 2/2018 | Yang | H04N 21/478 |
| 2018/0081928 A1* | 3/2018 | Ushijima | G06F 3/0608 |
| 2018/0314947 A1* | 11/2018 | Morris, II | G06N 5/02 |
| 2019/0095230 A1* | 3/2019 | Glessner | G06F 9/45558 |
| 2019/0138559 A1* | 5/2019 | Wang | G06F 16/951 |
| 2019/0250800 A1* | 8/2019 | Coldham | G06F 3/04845 |

\* cited by examiner

PROCESSING GAP EVENTS IN A CHANGE DETECTION MANAGEMENT SYSTEM

FIELD OF TECHNOLOGY

The present disclosure relates generally to database systems and data processing, and more specifically to processing gap events in a change detection management system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

When data stored at a data source (e.g., a database) is changed, a change detection and management system may detect these changes and report them to a downstream system that consumes or otherwise processes these changes. However, in some cases, the change detection and management system may fail to capture the changes occurring at the data source as a result of certain events at the data source (e.g., gap events). In such cases, there may be gaps in the change detection stream being reported to the downstream systems. These gaps in the change detection stream may cause failures or other inefficiencies at the downstream systems. For example, downstream systems may become temporarily inoperable and may require a manual restart or reconfiguration. In some cases, the downstream system may have to initiate a procedure to determine the changes that actually occurred at the data source during the gap event. Therefore, gaps in change detection streams caused by gap events may incur computational inefficiencies in downstream systems that process changes at a data source.

DETAILED DESCRIPTION

Figure 1:
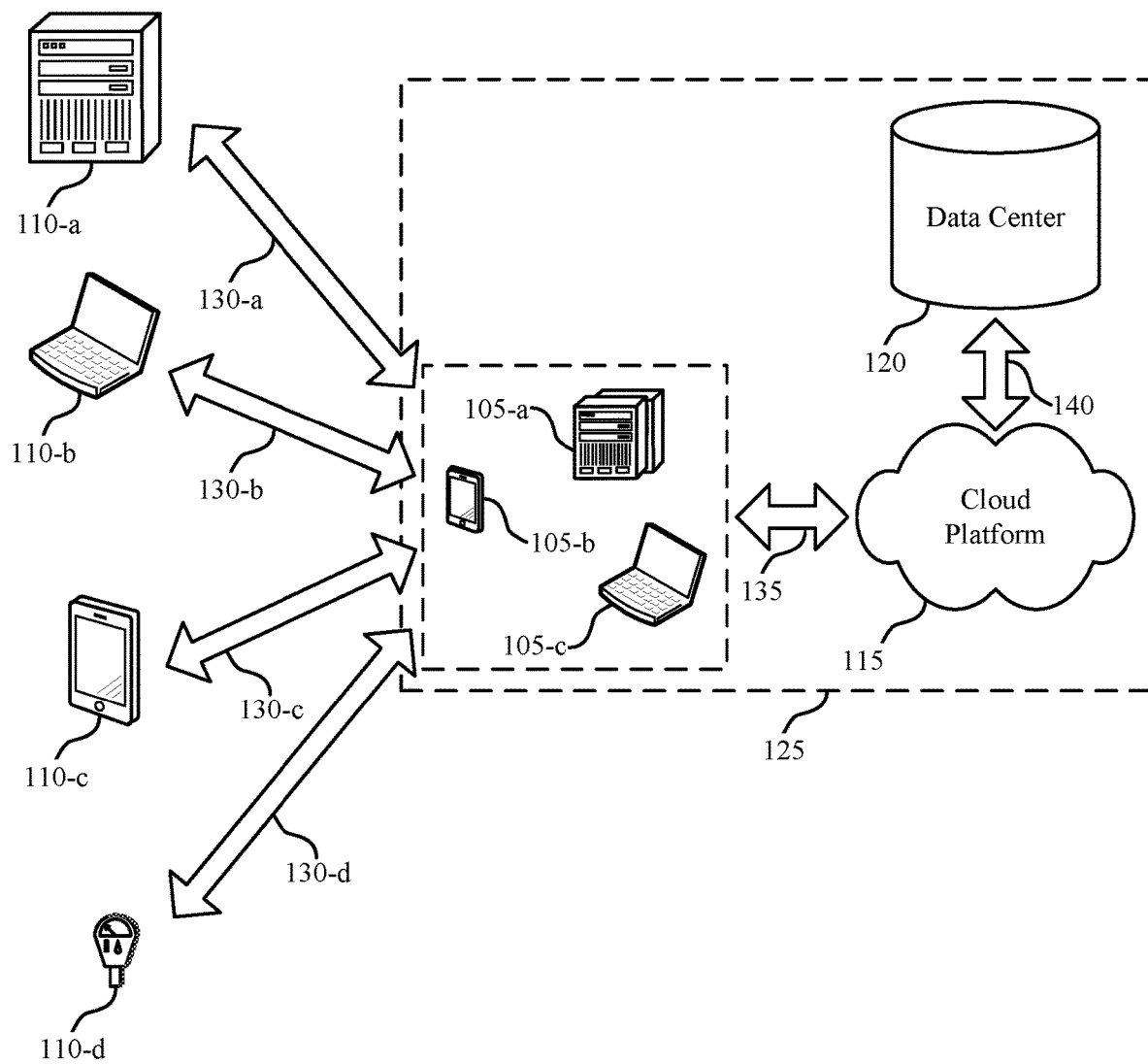
FIG. 1 illustrates an example of a system for data change detection at a data store that supports processing gap events in a change detection management system in accordance with aspects of the present disclosure.

When data stored at a data source (e.g., a database) undergoes one or more changes (e.g., updating records), the changes may be transmitted to a downstream system (e.g., a consumer) in the form of a change detection stream. Periodically, the change detection stream may be interrupted due to gap events at the data source such as planned system maintenance, system errors, system upgrades, or catastrophic system failures. When such an interruption occurs, there may be a gap in the change detection stream transmitted to the downstream system. Because a downstream system may not be configured to handle such gaps, these gaps may cause system failures or other types of computational inefficiencies to occur at the downstream system. For example, receiving a gap may result in the system being unable to detect future changes, accidental deletion of file logs, or data loss. In some cases, because of the gap in the change detection stream, the downstream system may have to initiate a procedure of going back in time before the gap event, and checking over all the data in the data source to determine what changes actually occurred during the gap event. Accordingly, a system capable of detecting and processing gaps in a change detection stream is desirable.

In a first example, a change detection stream may be identified. As described above, a change detection stream may indicate one or more changes in stored data (e.g., stored at a database) that are being transmitted to a downstream system. After identifying a change detection stream, the system may monitor the change detection stream for gap events. In some examples, gap events may be defined by a duration where a portion of the changes being transmitted (e.g., from a database to a downstream system) are missing from the change detection stream. Because a gap event may cause technical issues for the downstream system, a gap event identification message may be generated based on determining the gap event. In some examples, the gap event identification message may serve to "bridge" the gap event by utilizing metadata associated with the gap event. The gap event identification message may be inserted (e.g., injected) into the change detection stream and transmitted to the downstream system such that, when received by the downstream system, the negative consequences of the gap event are avoided.

In some examples, the system described herein may identify gap events associated with planned maintenance, system errors, disaster recovery events, or a combination thereof. For example, any of the aforementioned (or similar) events may result in one or more gaps in a change detection stream. As described above, a gap event identification message associated with the gap event may include metadata. The metadata may include, for example, a timestamp indicating a data or time associated with the gap event, an indication of a beginning and/or an end of a gap event, or any identifying characteristic of the gap event. By transmitting metadata associated with a gap event to the downstream system, the downstream system may be able to receive and process the change detection stream in an uninterrupted manner.

In other examples, the system described herein may detect one or more of gap events associated with a change detection stream. The system may then conduct a variety of operations on the gap events—such as ordering the events by time, merging non-overlapping gap events into a single gap event identification message, or ensuring that no gap events pre-date a particular gap event identification message—to aid the downstream system in receiving and processing the change detection stream.

Aspects of the disclosure are initially described in the context of an environment supporting an on-demand database service. Further aspects of the disclosure are described with respect to processing gap events in a change detection management system, such as at a database server. Aspects of the disclosure are further illustrated by and described with reference to apparatus diagrams, system diagrams, and flowcharts that relate to processing gap events in a change detection management system.

FIG. 1 illustrates an example of a system 100 for cloud computing that supports processing gap events in a change detection management system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The contacts 110 (e.g., in communication with subsystem 125) may be examples of one or more downstream systems, and data center 120 may be an example of or include, as a component, a data store to which a contact 110 may attempt to connect with. In accordance with aspects of the present disclosure, the data center 120 may be configured to transmit a change detection stream to one or more contacts 110. In some examples, the data center 120 may include or be in communication with a change detection and management system that detects changes at the data center 120 and transmits these changes to downstream systems. For example, data center 120 may transmit, via a change detection stream, system updates, updated records, or the like to one or more contacts 110. The transmitted data (e.g., system updates, updated records, etc.) may be ordinarily received by contact 110. However, as discussed above, expected or unexpected events such as system maintenance or a system error at data center 120 may result in an interruption (e.g., a gap) in the change detection stream. Accordingly, server 105-a (or some other component at the data center 120 or within the cloud platform 115) may identify and bridge the interruption in the transmission between data center 120 and contact 110. By bridging the gap event, contacts 110 may receive the changes in data without experiencing any setbacks due to a gap event.

In some examples, data stored at a data center 120 (e.g., a database) may undergo changes based on instructions received from an upstream source. However, data center 120 may experience gaps in the information received and may become temporarily inoperable. Due to the occurrence of one or more gaps in the information received, server 105-a may be required to review millions of rows of changes at the data center 120 to ensure that all changes have been captured before transmitting the data to one or more customers 110. However, if the data were transmitted to one or more customers without the server 105-a reviewing the rows of changes at the data center 120, the one or more customers 110 may experience temporary or prolonged inoperability due to receiving a gap in the information transmitted from data center 120. But server 105-*a* may identify and bridge the interruption in the changes received at data center 120, and in the transmission between data center 120 and one or more contacts 110. Accordingly, server 105-*a* may be prevented from reviewing millions of rows of changes at the data center 120 and, in turn, customers 110 may avoid any outages due to a gap event. Thus by bridging a gap event using metadata associated with the event, data store 120 and customers 110 may maintain ordinary operations when a gap event would ordinarily be received.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
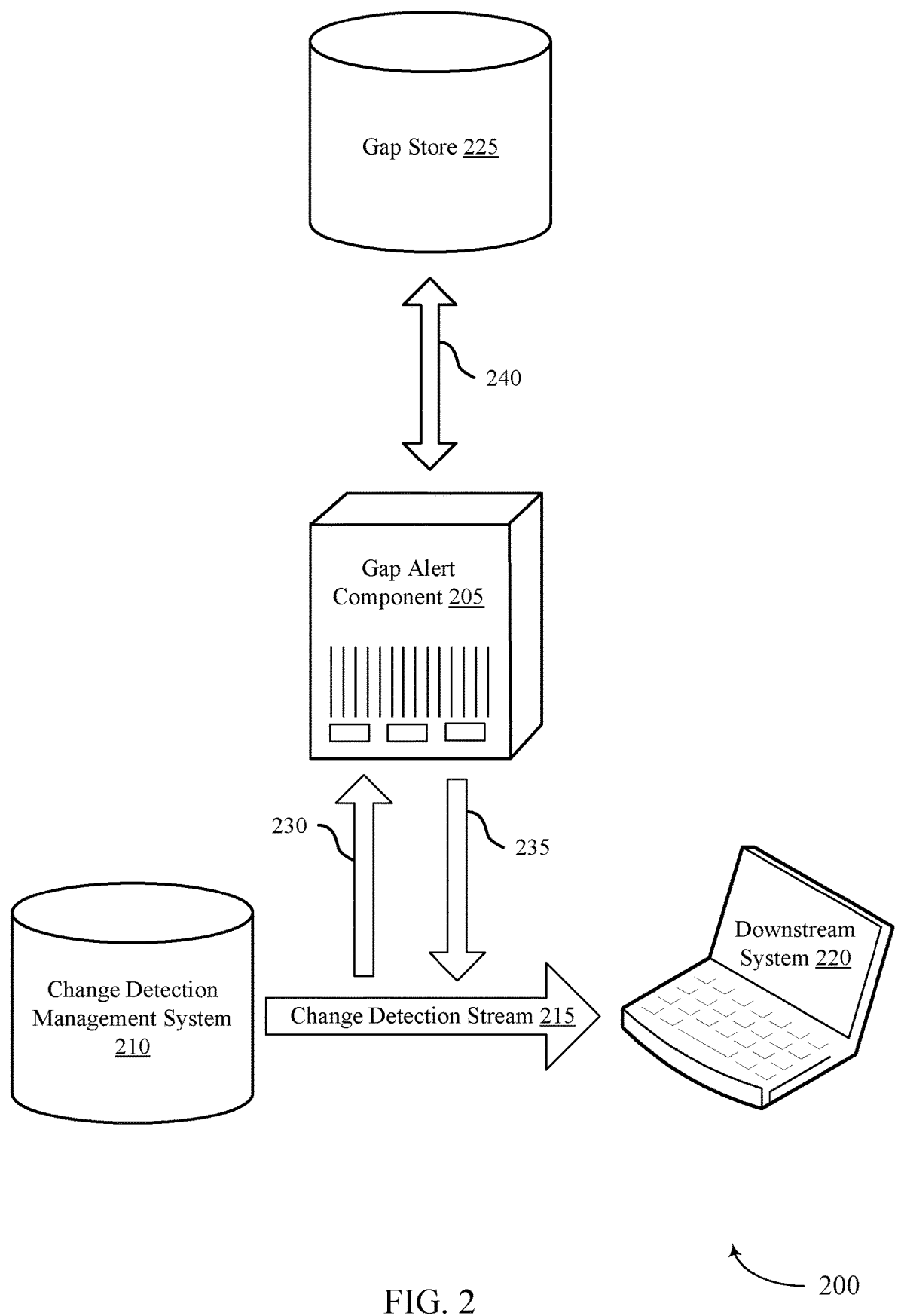
FIGS. 2 through 5 illustrate examples of database systems that support processing gap events in a change detection management system in accordance with aspects of the present disclosure.

FIG. 2 illustrates an example of a system 200 that supports processing gap events in a change detection management system in accordance with various aspects of the present disclosure. The system 200 may include a gap alert component 205 and a gap store 225. The system 200 may also include a change detection management system 210, which may be an example of the data center 120 or a component of the data center 120 as described with reference to FIG. 1; and a downstream system 220, which may be an example of a customer 110 or any other system or device that consumes or processes the changes at a data source, as described with reference to FIG. 1. In some cases, the change detection management system 210 may transmit a change detection stream 215 to the downstream system 220. The system 200 may also include one or more connections, such as connection 230, connection 235, and connection 240.

In some examples, change detection management system 210 may be referred to as a data store, or may be in communication with a data store, and may transmit a stream of changes (e.g., via change stream 215) to a downstream system 220.

Change detection management system 210 may facilitate changes associated with database activity (e.g., record updates, schema updates, object creation, etc.), and may pass the changes to a downstream system 220. The changes may be passed to downstream system 220 via a change detection stream 215. In some examples, a change in database activity (e.g., a record update) may be or may be represented by a change in a particular field of a table. For example, when a value of a particular field of a table is modified, change detection management system 210 may initiate a generation of a change event that represents changes to the data table. In some examples, each change event may be or may be represented by a change to an individual entry (e.g., one row or one column of a particular table). In other examples, each change event may be separate from a previous and subsequent change event. In other examples, each change event may be associated (e.g., linked) with one or more additional change events.

As described above, change detection management system 210 may pass changes to downstream system 220 via change detection stream 215. In some examples, consecutive changes may be passed to downstream system 220 via change detection stream 215 without interruption. In other examples, one or more interruptions (e.g., gaps) may exist in change detection stream 215. A gap may be characterized by a start time and an end time, and may be characterized as a portion of change detection stream 215 that includes missing changes. In some examples, a gap may imply that the change detection stream 215 includes lost or missing data, which may be referred to as the change detection stream 215 being lossy. Because a gap may be characterized by a start time and an end time, one gap—having one start time and one end time—may be referred to as a gap event. In some examples, a gap event may be transmitted to a downstream system—via change detection stream 220—due to maintenance conducted on change detection management system 210, an intermittent system error (e.g., of change detection management system 210), or a disaster recovery scenario in which a data center switch is required (e.g., a catastrophic failure of change detection management system 210). In any instance, it may be beneficial to detect one or more gaps in change detection stream 215 before the gap reaches a downstream system 220 to prevent inoperability of the downstream system 220.

To prevent a gap from reaching a downstream system 220, gap alert component 205 may detect one or more gap events in the change detection stream 215. As discussed above, a gap event may occur due to maintenance being conducted, a system error, or a catastrophic failure of change detection management system 210. Accordingly, gap alert component 205 may complement change detection management system 210 to ensure that one or more gaps are not transmitted to a downstream system 220 or that at least the downstream system has enough information about the gap to efficiently process the gap. Gap alert component 205 may receive an indication of change detection stream 215 (e.g., via connection 230), and may process the change detection stream 215 to detect one or more gap events within the stream. Gap alert component 205 may also detect a gap event by receiving signaling that indicates a planned gap event (e.g., system maintenance), or may otherwise detect that a gap event is occurring or about to occur.

Gap alert component 205 may generate a gap event identification message based on detecting the gap event. The gap event identification message may be or may include metadata associated with the gap event, which may be received from gap store 225 (e.g., via connection 240). Gap alert component 205 may then insert (e.g., inject) gap event identification message into the change detection stream 215 (e.g., via connection 235), and the message may be delivered to the downstream system 220. By inserting the gap event identification message into the change detection stream 215, the downstream system 220 may be able to recognize and process the gap event and may avoid issues of inoperability or other computational inefficiencies due to otherwise receiving a gap without the gap event identification message.

In some examples, the metadata associated with the gap event may include one or more of an internal (e.g., logical) timestamp, a timestamp (e.g., an external timestamp), gap start data, gap auditing data, a gap event class, and/or a gap impact data. In some examples, an internal timestamp may be or may be associated with an internal logical clock of the source database, and a timestamp may be or may be associated with a data and/or time of the gap event. Thus the internal timestamp may, for example, allow a downstream consumer to process a gap event using a more-specific time scale than by using a timestamp, alone.

Additionally or alternatively, gap start data may be or may be associated with a Boolean parameter that denotes whether a particular gap is a start or end event. In other examples, a gap event class may be or may include data that allows a downstream customer to identify the origin of a gap event. For example, a gap event class may indicate that a particular gap event is associated with planned system maintenance. In other examples, gap impact data may be or may be associated with the impact of a particular gap event. For example, gap impact data may indicate whether a particular gap event may affect an entire database, a single tenant, a specific partition, or the like.

Figure 3:
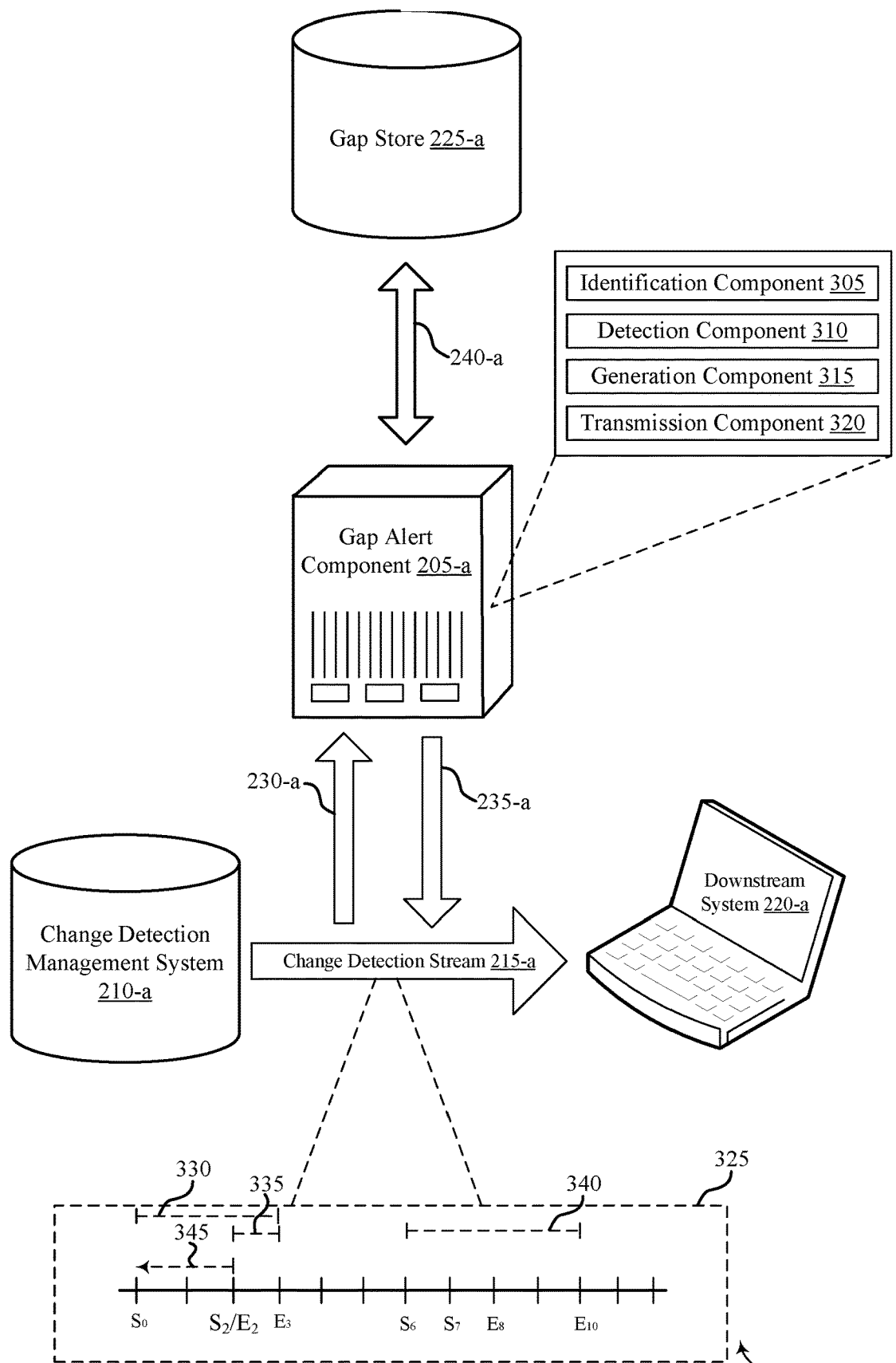

FIG. 3 illustrates an example of a system 300 that supports processing gap events in a change detection management system in accordance with various aspects of the present disclosure. The system 300 may include a gap alert component 205-a, which may be an example of gap alert component 205 as described with reference to FIG. 2; change detection management system 210-a, which may be an example of change detection management system 210 as described with reference to FIG. 2; change detection stream 215-a, which may be an example of change detection stream 215 as described with reference to FIG. 2; downstream system 220-a, which may be an example of downstream system 220 as described with reference to FIG. 2; and gap store 225-a, which may be an example of gap store 225 as described with reference to FIG. 2. In some examples, gap alert component 205-a may include identification component 305, detection component 310, generation component 315, and transmission component. Additionally or alternatively, change detection stream 215-a may include change stream 325, which may include time 330, time 335, time 340, and time 345.

As described above, change detection management system 210-a may transmit a stream of changes (e.g., via change stream 215-a) to downstream system 220-a. The change detection management system 210-a may facilitate changes associated with database activity, which may be or may be represented by a change in a particular field of a table. Multiple changes may be passed to downstream system 220-a via change detection stream 215-a, and some changes may non-consecutive (e.g., separated by a gap). A gap may be characterized by a start time and an end time and may imply that the change detection stream 215-a includes lost or missing data. Because it may be beneficial to detect one or more gaps in change detection stream 215-a before the gap reaches a downstream system 220-a, gap alert component 205-a may generate a gap event identification message based on detecting a gap event. By inserting the gap event identification message into the change detection stream 215-a, the downstream system 220-a may receive the change detection stream such that the negative consequences of the gap event are avoided In some examples, gap alert component 205-a may include an identification component 305. Identification component 305 may identify change detection stream 215-a. More-specifically, identification component 305 may identify one or more changes in change detection stream 215-a (e.g., via connection 230-a) that are being transmitted form change detection management system 210-a to downstream system 220-a via change detection stream 215-a. In some examples, identification component 305 may identify one or more characteristics of a particular change being transmitted to downstream system 220-a. For example, identification component 305 may identify metadata associated with the transmitted change.

In some examples, gap alert component 205-a may include a detection component 310. Detection component 310 may detect one or more gap events in change detection stream 215-a. More-specifically, detection component 310 may detect a gap event in the change detection stream 215-a having a duration (e.g., a start time and an end time). Detection component 310 may detect that at least a portion of the changes in the data (e.g., an updated record) are missing from the change detection stream. In other examples, detection component 310 may detect one or more additional gap events which may be utilized in two-phase aggregation or consumable gaps, which are discussed in greater detail below.

Additionally or alternatively, gap alert component 205-a may include generation component 315. Generation component 315 may generate a gap event identification message. In some examples, generation component 315 may generate a gap event identification message based in part on detection component 310 detecting one or more gap events in change detection stream 215-a. In some examples, a gap event identification message may be created in response to determining a gap event in change detection stream 215-a and may be transmitted to downstream system 220-a to ensure that the downstream system 220-a is not rendered inoperable due to the gap event. Generation component 315 may generate the gap event identification message using metadata associated with the gap event. That is, the gap event identification message may include metadata associated with the gap event. To include metadata in the message, gap alert component 205-a may be in communication with gap store 225-a (e.g., via connection 240-a). Gap store 225-a may store metadata associated with a plurality of gap events such that the gap alert component (e.g., generation component 315) may utilize particular metadata when generating a gap event identification message.

In some examples, gap alert component 205-a may include transmission component 320. Transmission component 320 may transmit the gap event identification message to the downstream system 220-a. In some examples, transmission component 320 may be in communication with change detection stream 215-a (e.g., via connection 235-a) to transmit the gap event identification message to the change detection stream 215-a. After transmitting the gap event to the change detection stream 215-a, the gap event identification message may be delivered to the downstream system 220-a.

As described above, change detection stream 215-a may be or may include change stream 325. Change stream 325 may represent a stream of changes transmitted from change detection management system 210-a to downstream system 220-a. In some examples, change stream 325 may include one or more gap events addressed by gap alert component 205-a. Change stream 325 may include a plurality of event starts denoted by "S" (e.g., $S_0$) and a plurality of event ends denoted by "E" (e.g., $E_3$). For example, a gap event may occur during time 335. The gap event may start at $S_2$, which may represent the start of the gap event at time "2" and may end at $E_3$, which may represent the end of the gap event at time "3". Each time (e.g., a start time, an end time) may be associated with a gap event, and may be referred to as a timestamp. Each timestamp may be associated with the change detection stream 215-a, and may indicate a date and time associated with the gap event. In other examples, the timestamp may be an indication of whether the gap event identification message (e.g., generated by generation component 315) is associated with a gap event start or a gap event end. In other examples, each timestamp may be an external timestamp or an internal (e.g., logical) timestamp. For example, an external timestamp may be or may be associated with an actual date and/or time of a gap event, and an internal timestamp may be or may be associated with an internal logical clock of the source database.

In some examples, system 300 may aggregate one or more gaps prior to the gap event identification message being transmitted to the downstream system 220-a. This process may be referred to as two-phase aggregation, and may include a "collapse" phase and a "merge" phase. In some examples, the collapse phase may operate in the context of an individual gap event producer (e.g., a common gap event producer), which may be a unique gap event type (e.g., planned system maintenance) and a unique gap event scope (e.g., a database wide impact).

During the collapse phase, consecutive event starts (e.g., $S_0$) may be combined into a single event start using a timestamp associated with the earliest event start. For example, time 330 includes the sequence $S_0$, $S_2$, $E_3$. In this example, the consecutive event starts (e.g., $S_0$, $S_2$) may be combined and may use the timestamp associated with the earliest event start (e.g., $S_0$). Thus, during a collapse phase, the sequence $S_0$, $S_2$, $E_3$ may be collapsed into the sequence $S_0$, $E_3$. Accordingly, the collapse phase may be an example of determining that at least a subset of a gap event and one or more additional gap events are associated with a common gap event producer and collapsing the subset of the gap event and the detected one or more additional gap events into one or more combined non-overlapping gap events for the common gap event producer.

As described above, two-phase aggregation may also include a "merge" phase. In some examples, the merge phase may operate across multiple gap event producers (e.g., multiple planned system maintenance events, a planned system maintenance event and a planned system outage, etc.) to merge all gap events into an ordered, serial sequence of gap events. Because different gaps may overlap in time, it may be beneficial to minimize the amount of gaps such that gap alert component 205-a may generate a minimum amount of gap event identification messages. For example, time 340 may include overlapping gaps $S_6$, $E_8$ and gap $S_7$, $E_{10}$. Post-merge phase, the gaps may be merged into a single gap event (e.g., at time 345) having start time $S_6$ and end time $E_{10}$. Accordingly, the merge phase may be an example of identifying a plurality of combined non-overlapping gap events that are associated with a plurality of gap event producers and merging the plurality of combined non-overlapping gap events for each of the plurality of gap event producers into one or more combined non-overlapping gap events for the plurality of gap event producers.

In some examples, system 300 may deliver gap event identification messages to a downstream system 220-a that are deemed safe to deliver. Such gap event identification messages may be referred as being "consumable" by the downstream system 220-a. When delivering consumable gaps, gap alert component 205-a may ensure that transmitted gap event identification messages are both complete and immutable. Stated another way, gap alert component 205-a may ensure that all gaps prior to an established timestamp have been delivered to the downstream system 220-a.

For example, time 330 includes gap event $S_0$, $E_3$ and time 340 includes gap event $S_6$, $E_{10}$. To ensure that a gap event identification message associated with gap $S_0$, $E_3$ is delivered before a gap event identification message associated gap $S_6$, $E_{10}$, a timestamp may be arbitrarily inserted. This timestamp may be derived, for example, from the timestamp of the latest change found on the change stream. For example, a timestamp may be inserted at time "2" (e.g., at $S_2/E_2$). Accordingly, a gap event identification message associated with the time beginning at $S_0$ and terminating at the timestamp (e.g., $E_2$) may be delivered to the downstream system 220-a. Any gap events postdating the timestamp may be held back until all gap events predating the timestamp have been identified. For example, because a timestamp may exist at $S_2/E_2$, time 345 may represent all gap events that predate time $E_2$. Thus a gap event identification message associated with gap event $S_0$, $E_2$ may be transmitted to downstream system 220-a. Accordingly, the notion of consumable gaps may be associated with identifying a timestamp in the change detection stream such that all gap events preceding the timestamp have been identified. In some examples, the gap event identification message may include metadata associated with gap events that precede the timestamp. In other examples, consumable gaps may be associated with determining that one or more gap events that postdate the timestamp have been identified and advancing the timestamp to a time that postdates the one or more gap events.

Some gap events may be pruned to ensure that a gap event identification message may be consumable by a downstream system 220-a. In other examples, gap alert component 205-a may periodically prune gap events that are older than a predetermined time. For example, gap alert component 205-a may periodically prune gap events older than 30 days. This may ensure that gap alert component 205-a avoids accumulating too many gap events. For example, 300 may include gap event $S_0$, $E_3$. In some examples, the portion of the gap event between $S_2/E_2$ and $E_3$ may exceed the predetermined time (e.g., older than 30 days). Accordingly, any gap events prior to $E_3$ may be pruned.

Figure 4:
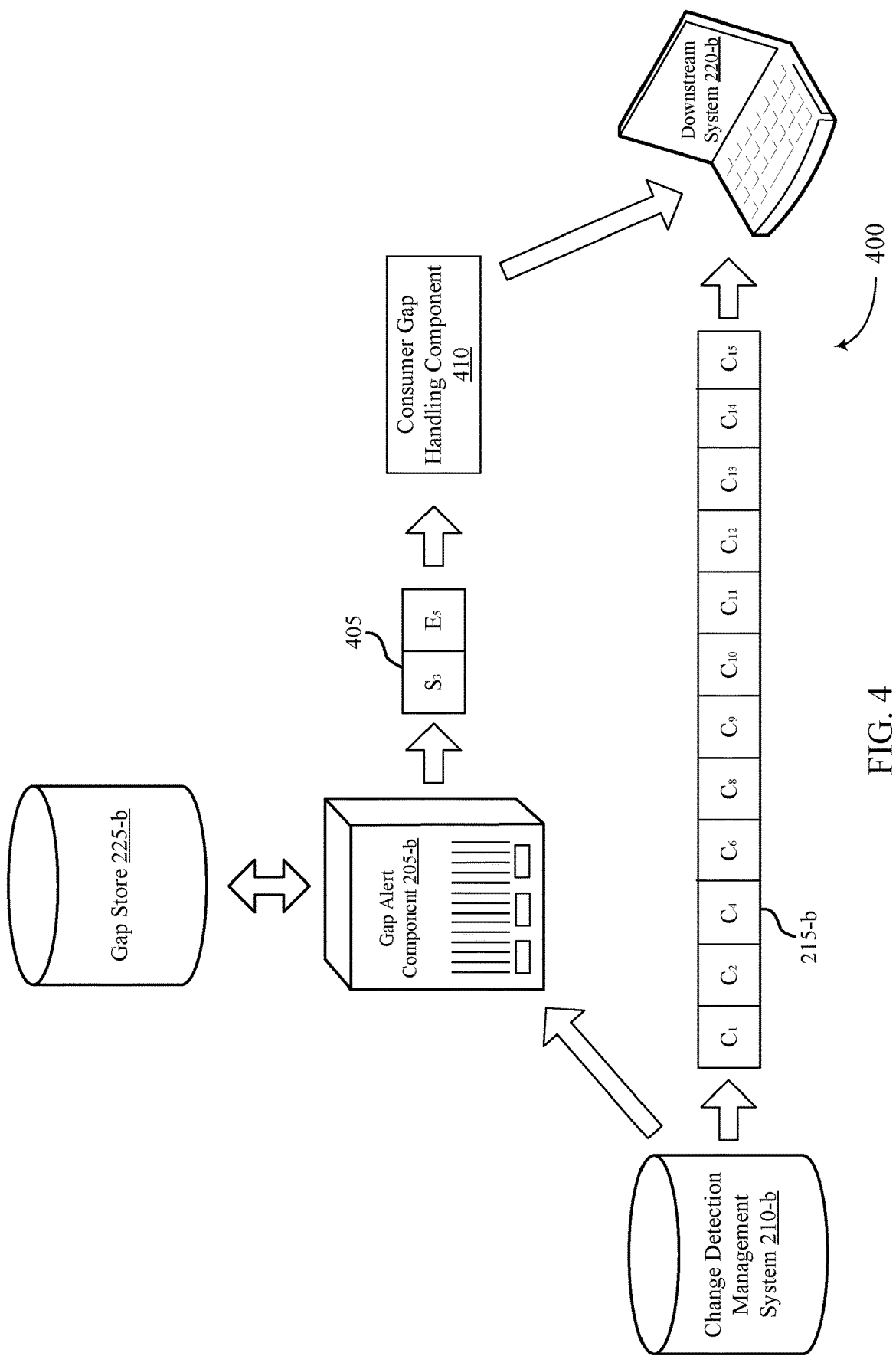

FIG. 4 illustrates an example of a system 400 that supports processing gap events in a change detection management system in accordance with various aspects of the present disclosure. The system 400 may include a gap alert component 205-b, which may be an example of gap alert component 205-a as described with reference to FIG. 3; change detection management system 210-b, which may be an example of change detection management system 210-a as described with reference to FIG. 3; change detection stream 215-b, which may be an example of change detection stream 215-a as described with reference to FIG. 3; downstream system 220-b, which may be an example of downstream system 220-a as described with reference to FIG. 3; and gap store 225-b, which may be an example of gap store 225-a as described with reference to FIG. 3. In some examples, system 300 may include gap event identification message 405 and consumer gap handling component 410.

In some examples, system 400 may illustrate an example of delivering a gap event identification message 405 to downstream system 220-b. In some examples, the particular delivery method may be referred to as an "out-of-band" delivery method. In an out-of-band delivery method, each downstream system 220-b may receive and process a gap event identification message 405 independent of a change detection stream 215-a. For example, change detection management system 210-b may transmit a stream of changes (e.g., via change stream 215-b) to downstream system 220-b. In some examples, each of blocks $C_1$ through $C_{15}$ may represent a start or an end time of a particular gap event.

As described above with reference to FIG. 3, gap alert component 205-b may include one or more sub-components that may detect a gap event and generate a gap event identification message. For example, change detection stream 215-b may include a gap event associated with blocks $C_3$ through $C_5$. Gap alert component 205-*b* may first detect the gap event (e.g., having start time $S_3$ and end time $E_5$). After detecting the gap event, gap alert component 205-*b* may generate gap event identification message 405 based in part on detecting the gap event. As described above, in an out-of-band delivery method, the gap event identification message 405 may be transmitted to downstream system 220-*c* independent of change stream 215-*b*. In some examples, the consumer gap handling component 410 may be located external to the downstream system 220-*b* and may facilitate the transmission of the gap event identification message 405 to the downstream system 220-*b*. For example, the consumer gap handling component 410 may include logic to deliver the gap event identification message 405 to the downstream system 220-*b* in a sequential order such that the gap event identification message 405 is inserted (e.g., injected) in an appropriate location the change detection stream 215-*b* (e.g., inserted in the location of blocks $C_3$ through $C_5$).

In some examples, an out-of-band delivery method may support optimization to avoid returning (e.g., transmitting) the same gaps to a downstream system 220-*b* multiple times. This process may be referred to as a "gap cursor". In some examples, a timestamp associated with the last consumable gap event identification message 405 may be returned (e.g., returned to consumer gap handling component 410). Once returned, the timestamp may act as a cursor to ensure that new, incremental gaps are transmitted to the downstream system 220-*b*.

In other examples, an out-of-band delivery method may support caching aggregated gaps (e.g., at gap store 225-*b*). For example, when a gap event identification message 405 is transmitted to a downstream system 220-*b*, the gap event identification message 405 may be cached at gap store 225-*b*. Because gap events occur infrequently, a subsequent same gap event may result in the cached gap event being replaced. Accordingly, when gap alert component 205-*b* detects a gap event associated with a cached gap event identification message 405, the gap alert component 205-*b* may transfer the gap event identification message 405 from the gap store 225-*b* to the downstream system 220-*b*.

Figure 5:
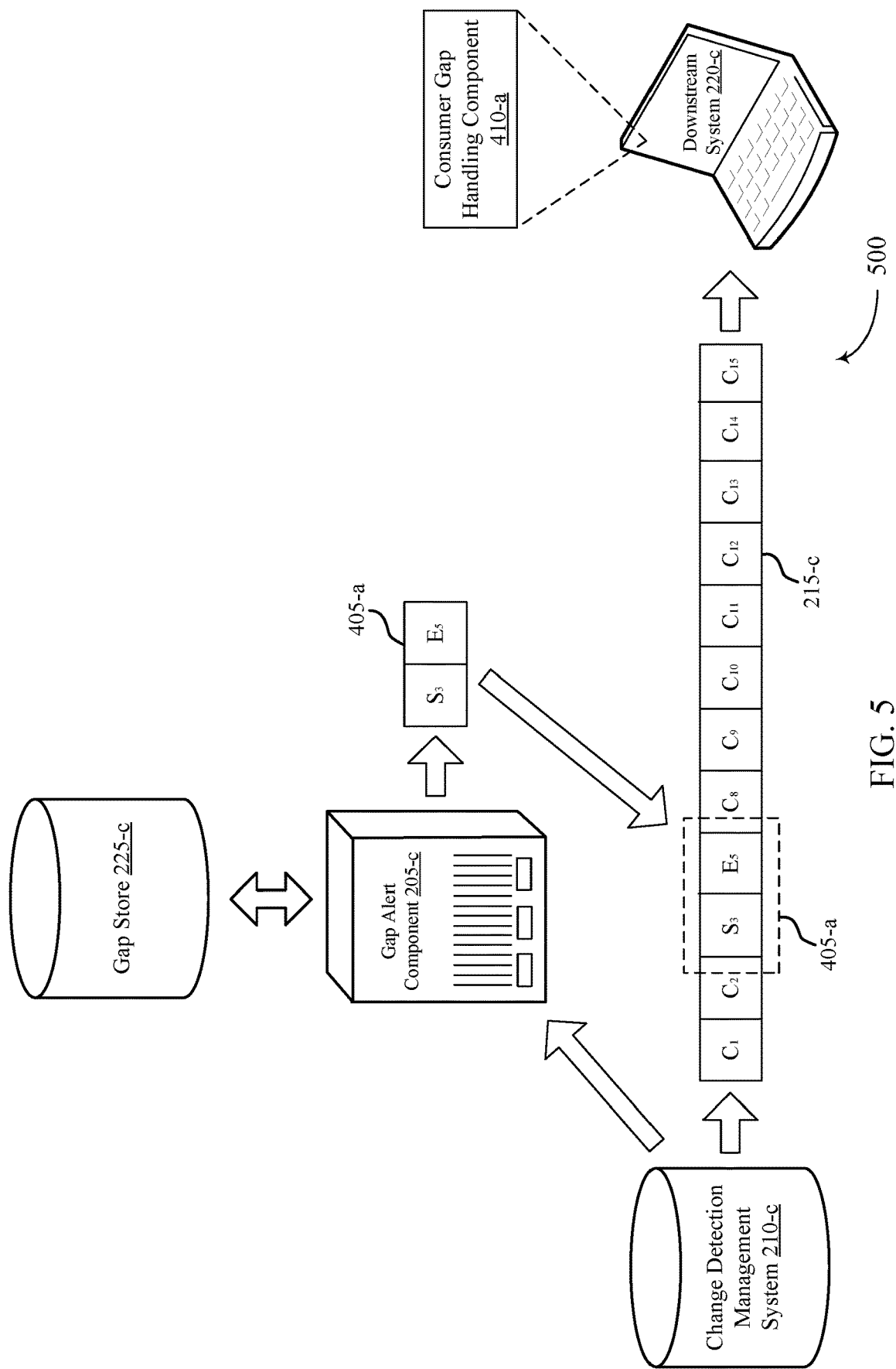

FIG. 5 illustrates an example of a system 500 that supports processing gap events in a change detection management system in accordance with various aspects of the present disclosure. The system 500 may include a gap alert component 205-*c*, which may be an example of gap alert component 205-*a* as described with reference to FIG. 3; change detection management system 210-*c*, which may be an example of change detection management system 210-*a* as described with reference to FIG. 3; change detection stream 215-*c*, which may be an example of change detection stream 215-*a* as described with reference to FIG. 3; downstream system 220-*c*, which may be an example of downstream system 220-*a* as described with reference to FIG. 3; and gap store 225-*c*, which may be an example of gap store 225-*a* as described with reference to FIG. 3. In some examples, system 300 may include gap event identification message 405-*a* and consumer gap handling component 410-*a*.

In some examples, system 500 may illustrate an example of delivering a gap event identification message 405-*a* to downstream system 220-*b*. In some examples, the particular delivery method may be referred to as an "in-line" delivery method. In an in-line delivery method, each downstream system 220-*b* may receive and process a gap event identification message 405-*a* as a part of a change detection stream 215-*a*. For example, change detection management system 210-*c* may transmit a stream of changes (e.g., via change stream 215-*c*) to downstream system 220-*c*. In some examples, each of blocks $C_1$ through $C_{15}$ may represent a start or an end time of a particular gap event.

As described above with reference to FIG. 3, gap alert component 205-*c* may include one or more sub-components that may detect a gap event and generate a gap event identification message. For example, change detection stream 215-*c* may include a gap event associated with blocks $C_3$ through $C_5$. Gap alert component 205-*c* may first detect the gap event (e.g., having start time $S_3$ and end time $E_5$). After detecting the gap event, gap alert component 205-*c* may generate gap event identification message 405-*a* based in part on detecting the gap event. As described above, in an in-line delivery method, the gap event identification message 405-*s* may be inserted (e.g., injected) into the change detection stream 415-*a*, which may be transmitted to the downstream system 220-*c*.

In some examples, the consumer gap handling component 410-*a* may be located internal to the downstream system 220-*c* and may facilitate the transmission of the gap event identification message 405-*a* to the downstream system 220-*c*. For example, the consumer gap handling component 410-*a* may include logic to process the gap event identification message 405-*a* in a sequential order once received at the downstream system 220-*c*.

Figure 6:
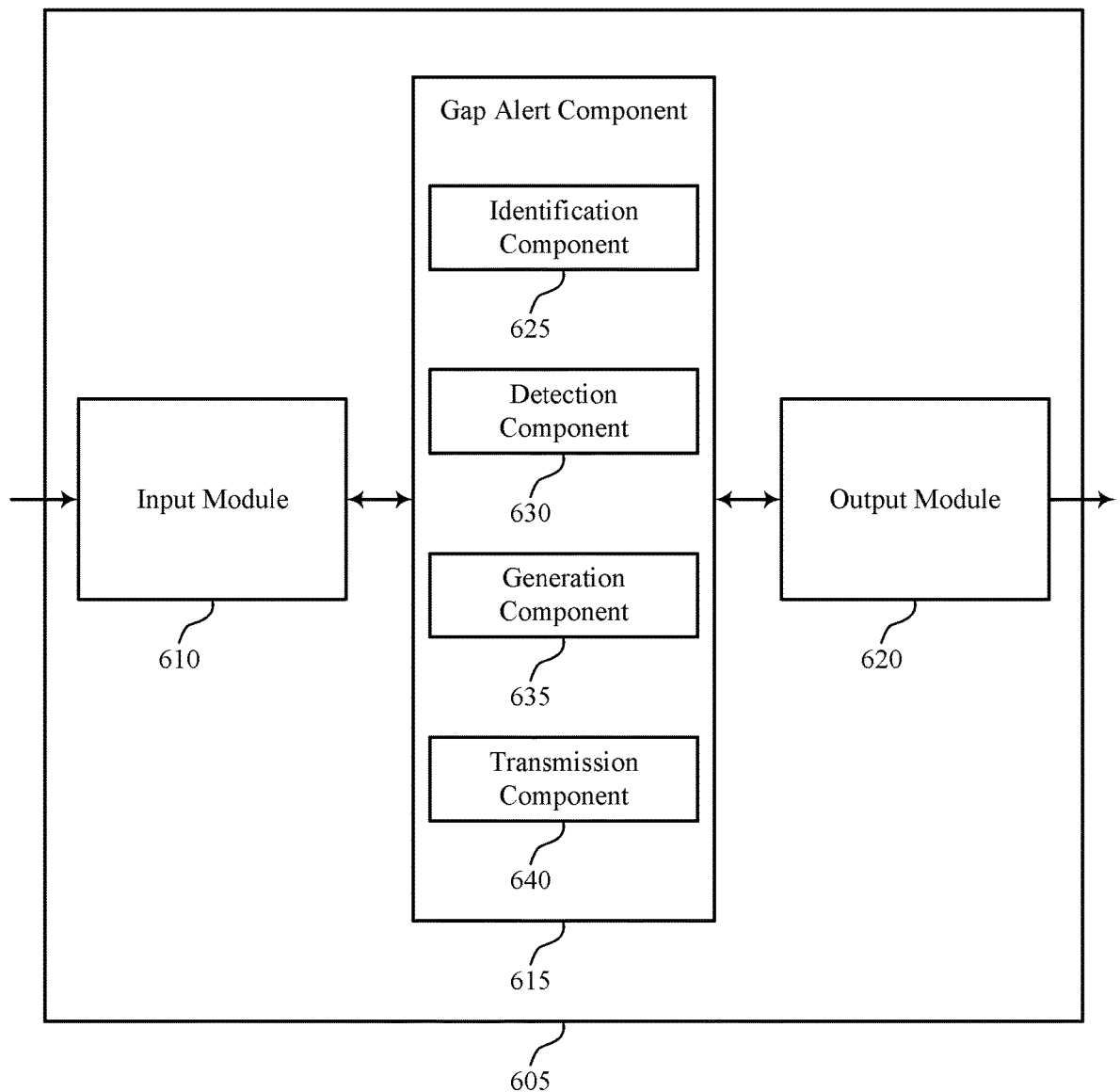
FIGS. 6 through 7 show block diagrams of a device that supports processing gap events in a change detection management system in accordance with aspects of the present disclosure.

FIG. 6 shows a block diagram 600 of an apparatus 605 that supports processing gap events in a change detection management system in accordance with aspects of the present disclosure. Apparatus 605 may include input module 610, gap alert component 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Gap alert component 615 may be an example of aspects of the gap alert component 815 described with reference to FIG. 8.

Gap alert component 615 and/or at least some of its various sub-components may be implemented in hardware, software executed by a processor, firmware, or any combination thereof. If implemented in software executed by a processor, the functions of the gap alert component 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The gap alert component 615 and/or at least some of its various sub-components may be physically located at various positions, including being distributed such that portions of functions are implemented at different physical locations by one or more physical devices. In some examples, gap alert component 615 and/or at least some of its various sub-components may be a separate and distinct component in accordance with various aspects of the present disclosure. In other examples, gap alert component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Gap alert component 615 may also include identification component 625, detection component 630, generation component 635, and transmission component 640.

Identification component 625 may identify a change detection stream that indicates changes in data at the data store to a downstream system. In some examples, identification component 625 may identify a set of combined non-overlapping gap events that are associated with a set of gap event producers. In other examples, identification component 625 may identify a timestamp in the change detection stream such that all gap events preceding the timestamp have been identified, where the gap event identification message includes metadata associated with gap events that precede the timestamp. Additionally or alternatively, identification component 625 may identify the gap event identification message transmitted to the downstream system. In some cases, the metadata associated with the gap event may include a logical timestamp associated with the data store, a timestamp indicating a date and time associated with the gap event, an indication of whether the gap event identification message is associated with a gap event start or a gap event end, an indication of an operator associated with the gap event identification message, an indication of a gap event class, an indication of a scope of the gap event, or some combination thereof. In some cases, the common gap event producer may be associated with a particular combination of a gap event type and a scope of the gap event.

Detection component 630 may detect a gap event having a duration where at least a portion of the changes in data at the data store are missing from the change detection stream. In some examples, detection component 630 may detect one or more additional gap events, where the gap event identification message further includes metadata associated with the detected one or more additional gap events, and detect a second gap event having a second duration where at least a portion of the changes in data at the data store are missing from the change detection stream.

Generation component 635 may generate a gap event identification message based on detecting the gap event. In some examples, the gap event identification message may include metadata associated with the gap event. In other examples, generation component 635 may generate a second gap event identification message based on detecting the gap event.

Transmission component 640 may transmit the gap event identification message to the downstream system. In other examples, transmission component 640 may transmit the second gap event identification message to the downstream system based on identifying the gap event identification message transmitted to the downstream system. In some cases, the gap event identification message may be transmitted to the downstream system separately from the change detection stream. In some cases, the gap event identification message may be transmitted to the downstream system as a part of the change detection stream.

Figure 7:
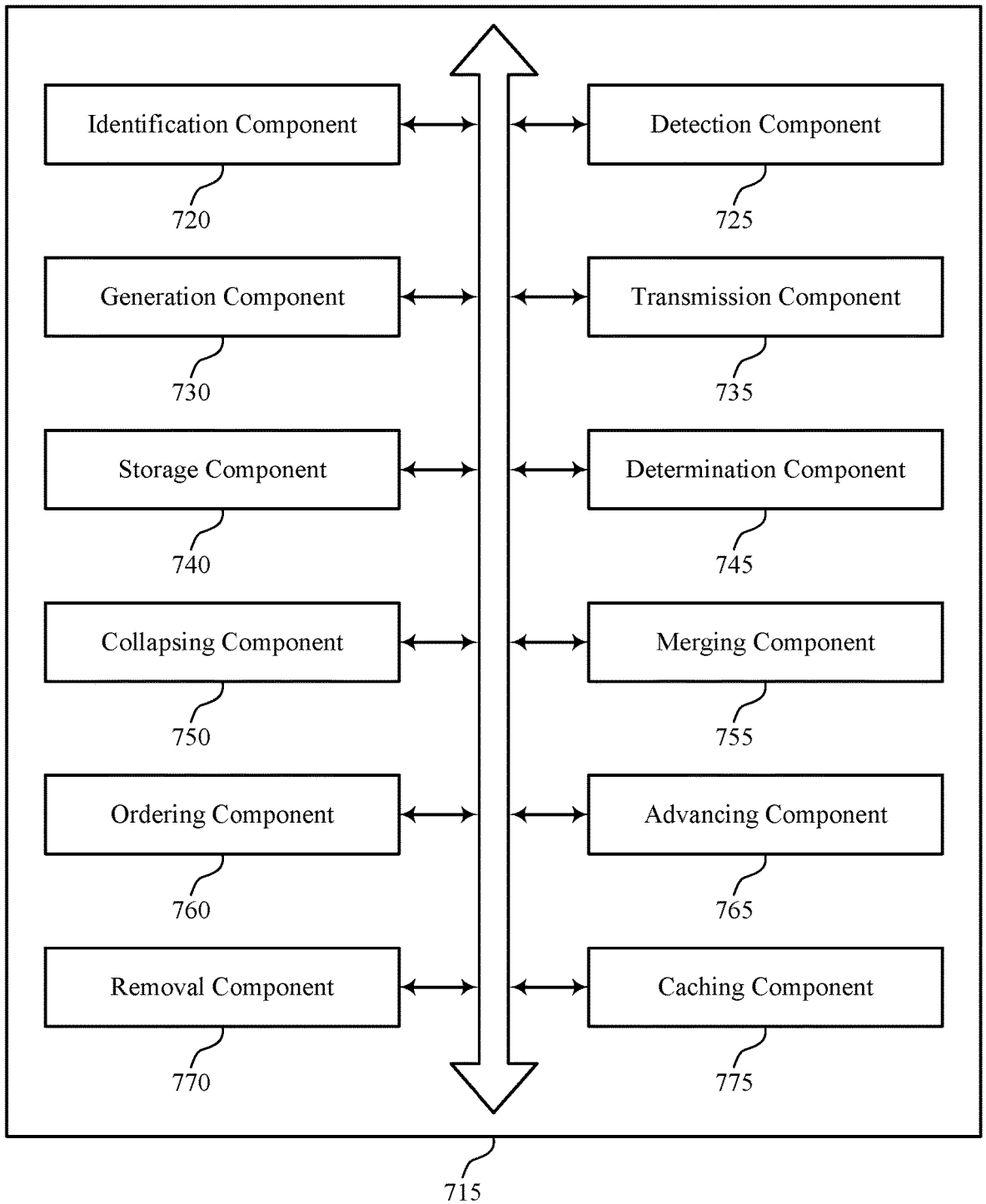

FIG. 7 shows a block diagram 700 of a gap alert component 715 that supports processing gap events in a change detection management system in accordance with aspects of the present disclosure. The gap alert component 715 may be an example of aspects of a gap alert component 815 described with reference to FIGS. 5, 6, and 8. The gap alert component 715 may include identification component 720, detection component 725, generation component 730, transmission component 735, storage component 740, determination component 745, collapsing component 750, merging component 755, ordering component 760, advancing component 765, removal component 770, and caching component 775. Each of these modules may communicate, directly or indirectly, with one another (e.g., via one or more buses).

Identification component 720 may identify a change detection stream that indicates changes in data at the data store to a downstream system. In some examples, identification component 720 may identify a set of combined non-overlapping gap events that are associated with a set of gap event producers. In other examples, identification component 720 may identify a timestamp in the change detection stream such that all gap events preceding the timestamp have been identified, where the gap event identification message includes metadata associated with gap events that precede the timestamp. Additionally or alternatively, identification component 720 may identify the gap event identification message transmitted to the downstream system. In some cases, the metadata associated with the gap event may include a logical timestamp associated with the data store, a timestamp indicating a date and time associated with the gap event, an indication of whether the gap event identification message is associated with a gap event start or a gap event end, an indication of an operator associated with the gap event identification message, an indication of a gap event class, an indication of a scope of the gap event, or some combination thereof. In some cases, the common gap event producer may be associated with a particular combination of a gap event type and a scope of the gap event.

Detection component 725 may detect a gap event having a duration where at least a portion of the changes in data at the data store are missing from the change detection stream. In some examples, detection component 725 may detect one or more additional gap events, where the gap event identification message further includes metadata associated with the detected one or more additional gap events. Additionally or alternatively, detection component 725 may detect a second gap event having a second duration where at least a portion of the changes in data at the data store are missing from the change detection stream.

Generation component 730 may generate a gap event identification message based on detecting the gap event. In some examples, the gap event identification message may include metadata associated with the gap event. In other examples, generation component 730 may generate a second gap event identification message based on detecting the gap event.

Transmission component 735 may transmit the gap event identification message to the downstream system. In some examples, transmission component 735 may transmit the second gap event identification message to the downstream system based on identifying the gap event identification message transmitted to the downstream system. In some cases, the gap event identification message may be transmitted to the downstream system separately from the change detection stream. In some cases, the gap event identification message may be transmitted to the downstream system as a part of the change detection stream.

Storage component 740 may store the gap event identification message as an immutable data object.

Determination component 745 may determine that at least a subset of the gap event and the detected one or more additional gap events are associated with a common gap event producer. In other examples, determination component 745 may determine that one or more gap events that postdate the timestamp have been identified. In some cases, the gap event may include a planned maintenance event, an intermittent system error, a disaster recovery event, or a combination thereof.

Collapsing component 750 may collapse the subset of the gap event and the detected one or more additional gap events into one or more combined non-overlapping gap events for the common gap event producer.

Merging component 755 may merge the set of combined non-overlapping gap events for each of the set of gap event producers into one or more combined non-overlapping gap events for the set of gap event producers.

Ordering component 760 may order the one or more combined non-overlapping gap events for the set of gap event producers according to a timestamp associated with each of the one or more combined non-overlapping gap events.

Advancing component 765 may advance the timestamp to a time that postdates the one or more gap events.

Removal component 770 may remove at least a portion of the detected gap event based on a timestamp associated with the gap event. In some examples, the gap event identification message may include metadata associated with a remaining portion of the detected gap event.

Caching component 775 may cache the gap event identification message at a distributed cache based on transmitting the gap event identification message to the downstream system.

Figure 8:
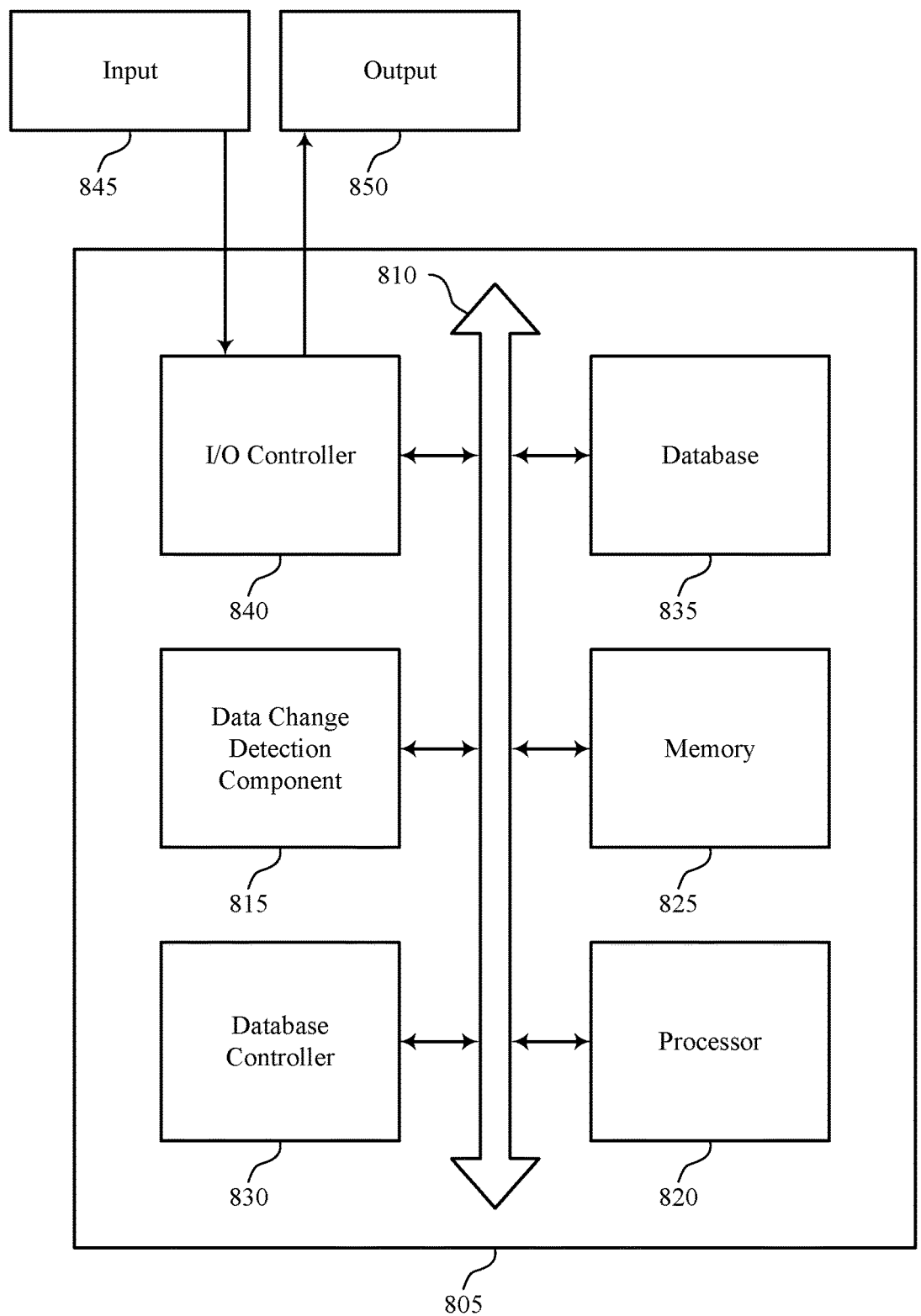
FIG. 8 illustrates a block diagram of a system including a gap alert component that supports processing gap events in a change detection management system in accordance with aspects of the present disclosure.

FIG. 8 shows a diagram of a system 800 including a device 805 that supports processing gap events in a change detection management system in accordance with aspects of the present disclosure. Device 805 may be an example of or include the components of gap alert component 205 as described above, e.g., with reference to FIG. 2. Device 805 may include components for bi-directional data communications including components for transmitting and receiving communications, including gap alert component 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting processing gap events in a change detection management system).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction.

Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
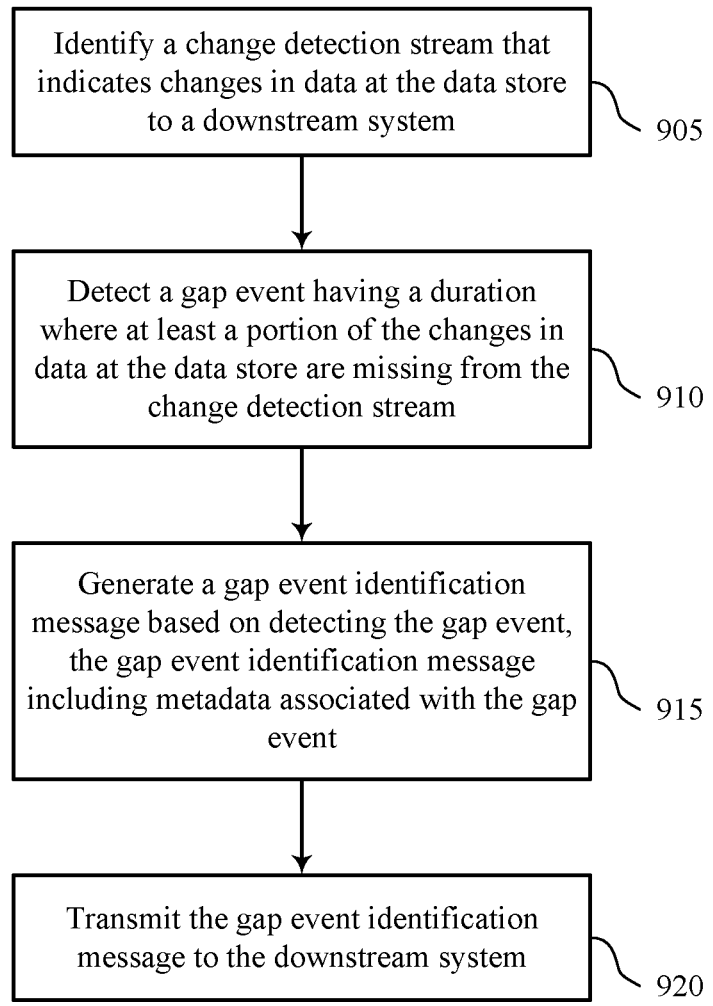
FIGS. 9 through 11 illustrate methods for processing gap events in a change detection management system in accordance with aspects of the present disclosure.

FIG. 9 shows a flowchart illustrating a method 900 for processing gap events in a change detection management system in accordance with aspects of the present disclosure. The operations of method 900 may be implemented by a gap alert component or its components as described herein. For example, the operations of method 900 may be performed by a gap alert component as described with reference to FIGS. 6 through 8. In some examples, a gap alert component may execute a set of codes to control the functional elements of the device to perform the functions described below. Additionally or alternatively, the gap alert component may perform aspects of the functions described below using special-purpose hardware.

At 905 the gap alert component may identify a change detection stream that indicates changes in data at the data store to a downstream system. The operations of 905 may be performed according to the methods described herein. In certain examples, aspects of the operations of 905 may be performed by an identification component as described with reference to FIGS. 6 through 8.

At 910 the gap alert component may detect a gap event having a duration where at least a portion of the changes in data at the data store are missing from the change detection stream. The operations of 910 may be performed according to the methods described herein. In certain examples, aspects of the operations of 910 may be performed by a detection component as described with reference to FIGS. 6 through 8.

At 915 the gap alert component may generate a gap event identification message based at least in part on detecting the gap event, the gap event identification message comprising metadata associated with the gap event. The operations of 915 may be performed according to the methods described herein. In certain examples, aspects of the operations of 915 may be performed by a generation component as described with reference to FIGS. 6 through 8.

At 920 the gap alert component may transmit the gap event identification message to the downstream system. The operations of 920 may be performed according to the methods described herein. In certain examples, aspects of the operations of 920 may be performed by a transmission component as described with reference to FIGS. 6 through 8.

Figure 10:
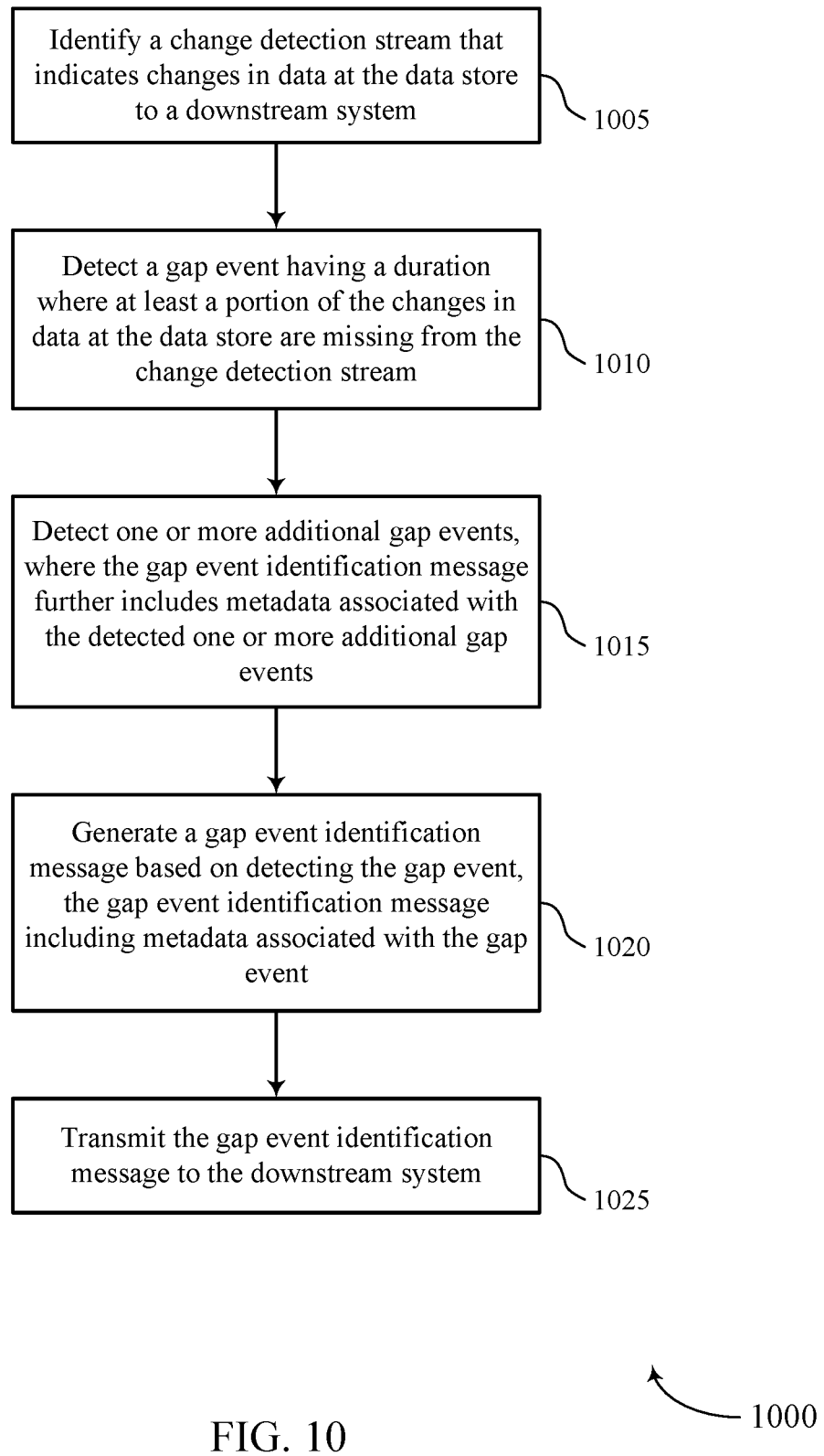

FIG. 10 shows a flowchart illustrating a method 1000 for processing gap events in a change detection management system in accordance with aspects of the present disclosure. The operations of method 1000 may be implemented by a gap alert component or its components as described herein. For example, the operations of method 1000 may be performed by a gap alert component as described with reference to FIGS. 6 through 8. In some examples, a gap alert component may execute a set of codes to control the functional elements of the device to perform the functions described below. Additionally or alternatively, the gap alert component may perform aspects of the functions described below using special-purpose hardware.

At 1005 the gap alert component may identify a change detection stream that indicates changes in data at the data store to a downstream system. The operations of 1005 may be performed according to the methods described herein. In certain examples, aspects of the operations of 1005 may be performed by an identification component as described with reference to FIGS. 6 through 8.

At 1010 the gap alert component may detect a gap event having a duration where at least a portion of the changes in data at the data store are missing from the change detection stream. The operations of 1010 may be performed according to the methods described herein. In certain examples, aspects of the operations of 1010 may be performed by a detection component as described with reference to FIGS. 6 through 8.

At 1015 the gap alert component may detect one or more additional gap events, wherein the gap event identification message further comprises metadata associated with the detected one or more additional gap events. The operations of 1015 may be performed according to the methods described herein. In certain examples, aspects of the operations of 1015 may be performed by a detection component as described with reference to FIGS. 6 through 8.

At 1020 the gap alert component may generate a gap event identification message based at least in part on detecting the gap event, the gap event identification message comprising metadata associated with the gap event. The operations of 1020 may be performed according to the methods described herein. In certain examples, aspects of the operations of 1020 may be performed by a generation component as described with reference to FIGS. 6 through 8.

At 1025 the gap alert component may transmit the gap event identification message to the downstream system. The operations of 1025 may be performed according to the methods described herein. In certain examples, aspects of the operations of 1025 may be performed by a transmission component as described with reference to FIGS. 6 through 8.

Figure 11:
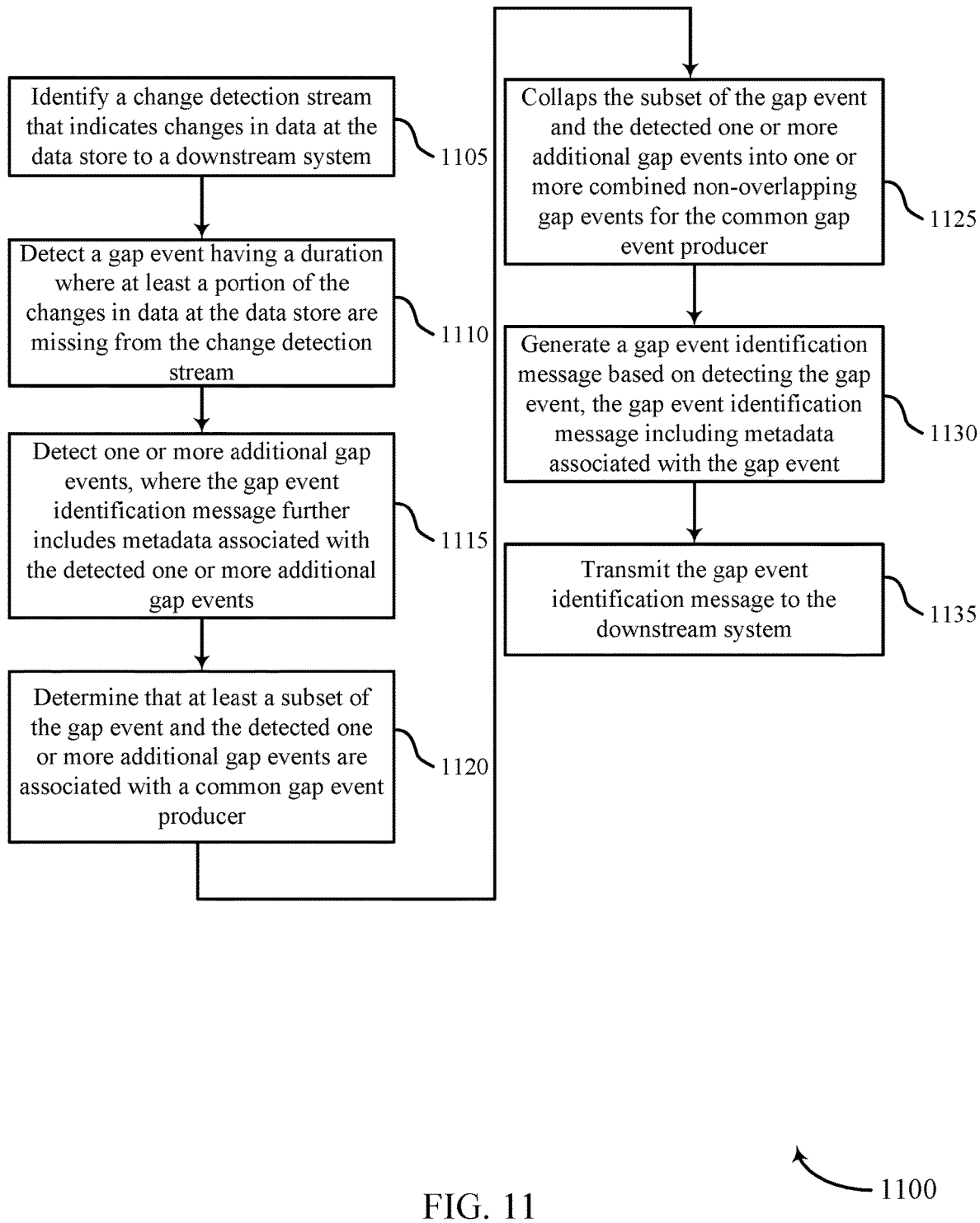

FIG. 11 shows a flowchart illustrating a method 1100 for processing gap events in a change detection management system in accordance with aspects of the present disclosure. The operations of method 1100 may be implemented by a gap alert component or its components as described herein. For example, the operations of method 1100 may be performed by a gap alert component as described with reference to FIGS. 6 through 8. In some examples, a gap alert component may execute a set of codes to control the functional elements of the device to perform the functions described below. Additionally or alternatively, the gap alert component may perform aspects of the functions described below using special-purpose hardware.

At 1105 the gap alert component may identify a change detection stream that indicates changes in data at the data store to a downstream system. The operations of 1105 may be performed according to the methods described herein. In certain examples, aspects of the operations of 1105 may be performed by an identification component as described with reference to FIGS. 6 through 8.

At 1110 the gap alert component may detect a gap event having a duration where at least a portion of the changes in data at the data store are missing from the change detection stream. The operations of 1110 may be performed according to the methods described herein. In certain examples, aspects of the operations of 1110 may be performed by a detection component as described with reference to FIGS. 6 through 8.

At 1115 the gap alert component may detect one or more additional gap events, wherein the gap event identification message further comprises metadata associated with the detected one or more additional gap events. The operations of 1115 may be performed according to the methods described herein. In certain examples, aspects of the operations of 1115 may be performed by a detection component as described with reference to FIGS. 6 through 8.

At 1120 the gap alert component may determine that at least a subset of the gap event and the detected one or more additional gap events are associated with a common gap event producer. The operations of 1120 may be performed according to the methods described herein. In certain examples, aspects of the operations of 1120 may be performed by a determination component as described with reference to FIGS. 6 through 8.

At 1125 the gap alert component may collapse the subset of the gap event and the detected one or more additional gap events into one or more combined non-overlapping gap events for the common gap event producer. The operations of 1125 may be performed according to the methods described herein. In certain examples, aspects of the operations of 1125 may be performed by a collapsing component as described with reference to FIGS. 6 through 8.

At 1130 the gap alert component may generate a gap event identification message based at least in part on detecting the gap event, the gap event identification message comprising metadata associated with the gap event. The operations of 1130 may be performed according to the methods described herein. In certain examples, aspects of the operations of 1130 may be performed by a generation component as described with reference to FIGS. 6 through 8.

At 1135 the gap alert component may transmit the gap event identification message to the downstream system. The operations of 1135 may be performed according to the methods described herein. In certain examples, aspects of the operations of 1135 may be performed by a transmission component as described with reference to FIGS. 6 through 8.

A method of data change detection at a data store is described. The method may include identifying a change detection stream that indicates changes in data at the data store to a downstream system, detecting a gap event having a duration where at least a portion of the changes in data at the data store are missing from the change detection stream, generating a gap event identification message based at least in part on detecting the gap event, the gap event identification message comprising metadata associated with the gap event, and transmitting the gap event identification message to the downstream system.

Another apparatus for data change detection at a data store is described. The apparatus may include a processor, memory in electronic communication with the processor, and instructions stored in the memory. The instructions may be operable to cause the processor to identify a change detection stream that indicates changes in data at the data store to a downstream system, detect a gap event having a duration where at least a portion of the changes in data at the data store are missing from the change detection stream, generate a gap event identification message based at least in part on detecting the gap event, the gap event identification message comprising metadata associated with the gap event, and transmit the gap event identification message to the downstream system.

A non-transitory computer-readable medium for data change detection at a data store is described. The non-transitory computer-readable medium may include instructions operable to cause a processor to identify a change detection stream that indicates changes in data at the data store to a downstream system, detect a gap event having a duration where at least a portion of the changes in data at the data store are missing from the change detection stream, generate a gap event identification message based at least in part on detecting the gap event, the gap event identification message comprising metadata associated with the gap event, and transmit the gap event identification message to the downstream system.

Some examples of the method, apparatus, and non-transitory computer-readable medium described above may further include processes, features, means, or instructions for storing the gap event identification message as an immutable data object.

In some examples of the method, apparatus, and non-transitory computer-readable medium described above, the gap event comprises a planned maintenance event, an intermittent system error, a disaster recovery event, or a combination thereof.

In some examples of the method, apparatus, and non-transitory computer-readable medium described above, the metadata associated with the gap event comprises a logical timestamp associated with the data store, a timestamp indicating a date and time associated with the gap event, an indication of whether the gap event identification message may be associated with a gap event start or a gap event end, an indication of an operator associated with the gap event identification message, an indication of a gap event class, an indication of a scope of the gap event, or some combination thereof.

Some examples of the method, apparatus, and non-transitory computer-readable medium described above may further include processes, features, means, or instructions for detecting one or more additional gap events, wherein the gap event identification message further comprises metadata associated with the detected one or more additional gap events.

Some examples of the method, apparatus, and non-transitory computer-readable medium described above may further include processes, features, means, or instructions for determining that at least a subset of the gap event and the detected one or more additional gap events may be associated with a common gap event producer. Some examples of the method, apparatus, and non-transitory computer-readable medium described above may further include processes, features, means, or instructions for collapsing the subset of the gap event and the detected one or more additional gap events into one or more combined non-overlapping gap events for the common gap event producer.

Some examples of the method, apparatus, and non-transitory computer-readable medium described above may further include processes, features, means, or instructions for identifying a plurality of combined non-overlapping gap events that may be associated with a plurality of gap event producers. Some examples of the method, apparatus, and non-transitory computer-readable medium described above may further include processes, features, means, or instructions for merging the plurality of combined non-overlapping gap events for each of the plurality of gap event producers into one or more combined non-overlapping gap events for the plurality of gap event producers.

In some examples of the method, apparatus, and non-transitory computer-readable medium described above, the one or more combined non-overlapping gap events for the plurality of gap event producers may be ordered according to a timestamp associated with each of the one or more combined non-overlapping gap events.

In some examples of the method, apparatus, and non-transitory computer-readable medium described above, the common gap event producer may be associated with a particular combination of a gap event type and a scope of the gap event.

Some examples of the method, apparatus, and non-transitory computer-readable medium described above may further include processes, features, means, or instructions for identifying a timestamp in the change detection stream such that all gap events preceding the timestamp may have been identified, wherein the gap event identification message comprises metadata associated with gap events that precede the timestamp.

Some examples of the method, apparatus, and non-transitory computer-readable medium described above may further include processes, features, means, or instructions for determining that one or more gap events that postdate the timestamp may have been identified. Some examples of the method, apparatus, and non-transitory computer-readable medium described above may further include processes, features, means, or instructions for advancing the timestamp to a time that postdates the one or more gap events.

In some examples of the method, apparatus, and non-transitory computer-readable medium described above, the gap event identification message may be transmitted to the downstream system separately from the change detection stream.

Some examples of the method, apparatus, and non-transitory computer-readable medium described above may further include processes, features, means, or instructions for identifying the gap event identification message transmitted to the downstream system. Some examples of the method, apparatus, and non-transitory computer-readable medium described above may further include processes, features, means, or instructions for detecting a second gap event having a second duration where at least a portion of the changes in data at the data store may be missing from the change detection stream. Some examples of the method, apparatus, and non-transitory computer-readable medium described above may further include processes, features, means, or instructions for generating a second gap event identification message based at least in part on detecting the gap event. Some examples of the method, apparatus, and non-transitory computer-readable medium described above may further include processes, features, means, or instructions for transmitting the second gap event identification message to the downstream system based at least in part on identifying the gap event identification message transmitted to the downstream system.

In some examples of the method, apparatus, and non-transitory computer-readable medium described above, the gap event identification message may be transmitted to the downstream system as a part of the change detection stream.

Some examples of the method, apparatus, and non-transitory computer-readable medium described above may further include processes, features, means, or instructions for removing at least a portion of the detected gap event based at least in part on a timestamp associated with the gap event, wherein the gap event identification message comprises metadata associated with a remaining portion of the detected gap event.

Some examples of the method, apparatus, and non-transitory computer-readable medium described above may further include processes, features, means, or instructions for caching the gap event identification message at a distributed cache based at least in part on transmitting the gap event identification message to the downstream system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data change detection at a data store, comprising:
    identifying a change detection stream that detects changes to data stored at the data store, and transmits the changes to a downstream system;
    detecting a gap event having a duration where at least a portion of the changes being transmitted to the downstream system are missing from the change detection stream;
    generating a gap event identification message based at least in part on detecting the gap event, the gap event identification message indicating the gap event to the downstream system, and comprising metadata associated with the gap event; and transmitting the gap event identification message to the downstream system.

2. The method of claim 1, further comprising:
storing the gap event identification message as an immutable data object.

3. The method of claim 1, wherein the gap event comprises a planned maintenance event, an intermittent system error, a disaster recovery event, or a combination thereof.

4. The method of claim 1, wherein the metadata associated with the gap event comprises a logical timestamp associated with the data store, a timestamp indicating a date and time associated with the gap event, an indication of whether the gap event identification message is associated with a gap event start or a gap event end, an indication of an operator associated with the gap event identification message, an indication of a gap event class, an indication of a scope of the gap event, or some combination thereof.

5. The method of claim 1, further comprising:
detecting one or more additional gap events, wherein the gap event identification message further comprises metadata associated with the detected one or more additional gap events.

6. The method of claim 5, further comprising:
determining that at least a subset of the gap event and the detected one or more additional gap events are associated with a common gap event producer; and
collapsing the subset of the gap event and the detected one or more additional gap events into one or more combined non-overlapping gap events for the common gap event producer.

7. The method of claim 6, further comprising:
identifying a plurality of combined non-overlapping gap events that are associated with a plurality of gap event producers; and
merging the plurality of combined non-overlapping gap events for each of the plurality of gap event producers into one or more combined non-overlapping gap events for the plurality of gap event producers.

8. The method of claim 7, wherein the one or more combined non-overlapping gap events for the plurality of gap event producers are ordered according to a timestamp associated with each of the one or more combined non-overlapping gap events.

9. The method of claim 7, wherein the common gap event producer is associated with a particular combination of a gap event type and a scope of the gap event.

10. The method of claim 1, further comprising:
identifying a timestamp in the change detection stream such that all gap events preceding the timestamp have been identified, wherein the gap event identification message comprises metadata associated with gap events that precede the timestamp.

11. The method of claim 10, further comprising:
determining that one or more gap events that postdate the timestamp have been identified; and
advancing the timestamp to a time that postdates the one or more gap events.

12. The method of claim 1, wherein the gap event identification message is transmitted to the downstream system separately from the change detection stream.

13. The method of claim 1, further comprising:
identifying the gap event identification message transmitted to the downstream system;

detecting a second gap event having a second duration where at least a portion of the changes in data at the data store are missing from the change detection stream;

generating a second gap event identification message based at least in part on detecting the gap event; and transmitting the second gap event identification message to the downstream system based at least in part on identifying the gap event identification message transmitted to the downstream system.

14. The method of claim 1, wherein the gap event identification message is transmitted to the downstream system as a part of the change detection stream.

15. The method of claim 1, further comprising:
removing at least a portion of the detected gap event based at least in part on a timestamp associated with the gap event, wherein the gap event identification message comprises metadata associated with a remaining portion of the detected gap event.

16. The method of claim 1, further comprising:
caching the gap event identification message at a distributed cache based at least in part on transmitting the gap event identification message to the downstream system.

17. An apparatus for data change detection at a data store, comprising:
a processor;
memory in electronic communication with the processor; and
instructions stored in the memory and executable by the processor to cause the apparatus to:
identify a change detection stream that detects changes to data stored at the data store, and transmits the changes to a downstream system;
detect a gap event having a duration where at least a portion of the changes being transmitted to the downstream system are missing from the change detection stream;
generate a gap event identification message based at least in part on detecting the gap event, the gap event identification message indicating the gap event to the downstream system, and comprising metadata associated with the gap event; and
transmit the gap event identification message to the downstream system.

18. The apparatus of claim 17, wherein the instructions are further executable by the processor to cause the apparatus to:
detect one or more additional gap events, wherein the gap event identification message further comprises metadata associated with the detected one or more additional gap events.

19. The non-transitory computer-readable medium storing code for data change detection at a data store, the code comprising instructions executable by a processor to:
identify a change detection stream that detects changes to data stored at the data store, and transmits the changes to a downstream system;
detect a gap event having a duration where at least a portion of the changes being transmitted to the downstream system are missing from the change detection stream;
generate a gap event identification message based at least in part on detecting the gap event, the gap event identification message indicating the gap event to the downstream system, and comprising metadata associated with the gap event; and transmit the gap event identification message to the downstream system.

20. The non-transitory computer-readable medium of claim 19, wherein the instructions are further executable by the processor to:
    detect one or more additional gap events, wherein the gap event identification message further comprises metadata associated with the detected one or more additional gap events.

* * * * *